(12) United States Patent
Dong et al.

(10) Patent No.: US 11,887,803 B2
(45) Date of Patent: Jan. 30, 2024

(54) X-RAY TUBE AND X-RAY GENERATING APPARATUS

(71) Applicant: Siemens Healthcare GmbH, Erlangen (DE)

(72) Inventors: Xiao Dong, WuXi (CN); Zhen Neng Zhang, Hangzhou (CN); Da Peng Hao, WuXi (CN); Qi Zhou, Wuxi (CN)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 17/745,135

(22) Filed: May 16, 2022

(65) Prior Publication Data
US 2022/0375711 A1     Nov. 24, 2022

(30) Foreign Application Priority Data

May 18, 2021   (CN) .......................... 202110539018.9

(51) Int. Cl.
*H01J 35/10*     (2006.01)
(52) U.S. Cl.
CPC ... *H01J 35/1024* (2019.05); *H01J 2235/1066* (2013.01); *H01J 2235/1086* (2013.01); *H01J 2235/1208* (2013.01)
(58) Field of Classification Search
CPC .... F16C 33/723; F16C 33/32; F16C 33/6696; F16C 19/546; F16C 2380/16; F16C 33/44; F16C 2206/06; F16C 17/045; F16C 17/107; F16C 33/1065; F16C 33/72; F16C 37/007; H01J 35/1024; H01J 2235/1066; H01J 2235/1086; H01J 2235/1208; H01J 35/106; H01J 2235/1204; H01J 2235/1279; H01J 35/105; H01J 2235/108; H01J 2235/1046; H01J 35/101; H01J 2235/1295; H01J 35/10; H01J 2235/102; H01J 2235/1053; H01J 2235/167; H01J 35/24; H01J 35/28; H01J 35/02; H01J 2235/106; Y10T 29/49826; Y10T 29/49702; Y10S 384/912
USPC ......................................................... 378/132
See application file for complete search history.

(56) References Cited

U.S. PATENT DOCUMENTS

| | | | | |
|---|---|---|---|---|
| 4,097,759 | A * | 6/1978 | Furbee | H01J 35/10 378/129 |
| 4,097,760 | A * | 6/1978 | Cinelli | H01J 35/1024 29/898.1 |
| 2004/0223589 | A1* | 11/2004 | Martin | H01J 35/1024 378/144 |
| 2004/0240763 | A1* | 12/2004 | R. | F16C 41/002 384/476 |
| 2008/0056450 | A1* | 3/2008 | Joshi | H01J 35/1024 378/132 |
| 2008/0279335 | A1* | 11/2008 | Qiu | F16C 33/6696 384/43 |

* cited by examiner

*Primary Examiner* — Irakli Kiknadze
(74) *Attorney, Agent, or Firm* — Banner & Witcoff Ltd.

(57) ABSTRACT

The disclosure relates to an X-ray tube, comprising a cathode and an anode, the cathode and anode being accommodated in a housing which provides a vacuum environment.

17 Claims, 1 Drawing Sheet

X-RAY TUBE AND X-RAY GENERATING APPARATUS

CROSS-REFERENCE TO RELATED APPLICATIONS

The present application claims the benefit of the filing date of China patent application no. CN 202110539018.9, filed on May 18, 2021, the contents of which are incorporated herein by reference in their entirety.

TECHNICAL FIELD

The present disclosure relates to the technical field of medical equipment and, in particular, to bearing lubrication technology for an X-ray tube with a rotating anode.

BACKGROUND

An X-ray tube is a type of vacuum tube that converts a power supply input to X-rays. Controllable sources of usable X-rays enabled the birth of a new radiography technique, i.e. the imaging of partially-opaque objects by penetrating rays. Unlike other ion radiation sources, X-rays are produced only when the X-ray tube is energized. X-ray tubes are widely used in computed tomography (CT) equipment, X-ray diffraction equipment, X-ray medical imaging equipment, and in the field of industrial flaw detection. The ever-growing demands of high-performance CT scanning equipment and angiography systems are driving the development of high-performance medical X-ray tube technology.

The vacuum tube used in an X-ray tube comprises a cathode filament for emitting electrons to a vacuum, and an anode for receiving the emitted electrons; thus, an electron stream called a beam is formed in the X-ray tube. A power supply providing a high voltage referred to as the tube voltage is connected between the anode and the cathode filament, so as to accelerate the electrons. The tube voltage is generally 30-200 kV.

In the X-ray tube, the high-energy electron beam bombards an anode target disk to generate X-rays; apart from a minority of the high-energy electrons that are converted to X-rays, the vast majority of the high-energy electrons are dissipated in the form of heat. In normal operation, the temperature of a bombardment point on the anode target disk can be as high as 2600° C.-2700° C., and the temperature of a bearing connected to the anode target disk at an end close to a flange is as high as 400° C. or more. This temperature destroys an anode bearing solid lubrication layer, lowering the lubricating ability and causing early failure of the X-ray tube. Thus, there is a need for an X-ray tube which takes into account the anode target disk bearing operating temperature as well as better noise characteristics.

SUMMARY

In view of the above, one aspect of the present disclosure proposes an X-ray tube capable of taking into account a high-temperature operating environment as well as low-noise characteristics for a bearing of an anode target disk during operation. The X-ray tube comprises a cathode configured to produce electrons emitted toward a vacuum when energized, and an anode configured to comprise a rotatable anode target disk in order to emit X-rays after sustaining bombardment by the electrons. The cathode and the anode are accommodated in a housing which provides a vacuum environment, wherein the X-ray tube further comprises a bearing assembly configured to carry the anode target disk. The bearing assembly comprises a rotation shaft configured to rotate with the anode target disk, and a bearing part comprising multiple bearing bodies which are constructed at an outer side of the rotation shaft and are in contact therewith and in a rolling fit therewith. The bearing bodies comprise at least one first rolling body configured to be located at a near-end position where the anode target disk is carried (e.g. coupled to), and at least one second rolling body configured to be located at a far-end position where the anode target disk is carried (e.g. coupled to), wherein a surface of the first rolling body is at least coated with a first lubrication layer, and a surface of the second rolling body is at least coated with a second lubrication layer, and wherein a temperature at which the first lubrication layer remains in a solid state is greater than a temperature at which the second lubrication layer remains in a solid state. That is, based on the operating temperatures of the bearing and the positions where the bearing is subjected to forces, the first lubrication layer that remains in a solid state at a higher temperature is used at a near end of the flange, while the second lubrication layer of lower hardness is used at a far end of the flange to take into account both the temperature characteristics and the noise characteristics of the bearing assembly.

Another aspect of the present disclosure provides an X-ray generating apparatus, comprising a power supply and the X-ray tube as described above, the power supply being configured to supply power to the X-ray tube.

One advantage of the X-ray tube provided in the present disclosure is that, based on the positions where the bearing is subjected to forces by the rotating anode target disk, the first lubrication layer that remains in a solid state at a higher temperature is applied to the first rolling body located at a near end of the flange, where the operating temperature is higher, such that the lubrication characteristics of the bearing maintain good performance at a higher temperature. Moreover, the second lubrication layer of lower hardness is applied to the second rolling body located at a far end of the flange to take into account both the low-noise and low-friction properties thereof.

BRIEF DESCRIPTION OF THE DRAWINGS/FIGURES

Embodiments of the present disclosure are described in detail below with reference to the accompanying drawings, to give those skilled in the art a clearer understanding of the abovementioned and other features and advantages of the present disclosure. In the drawings.

KEY TO THE FIGURES

Figure 1:
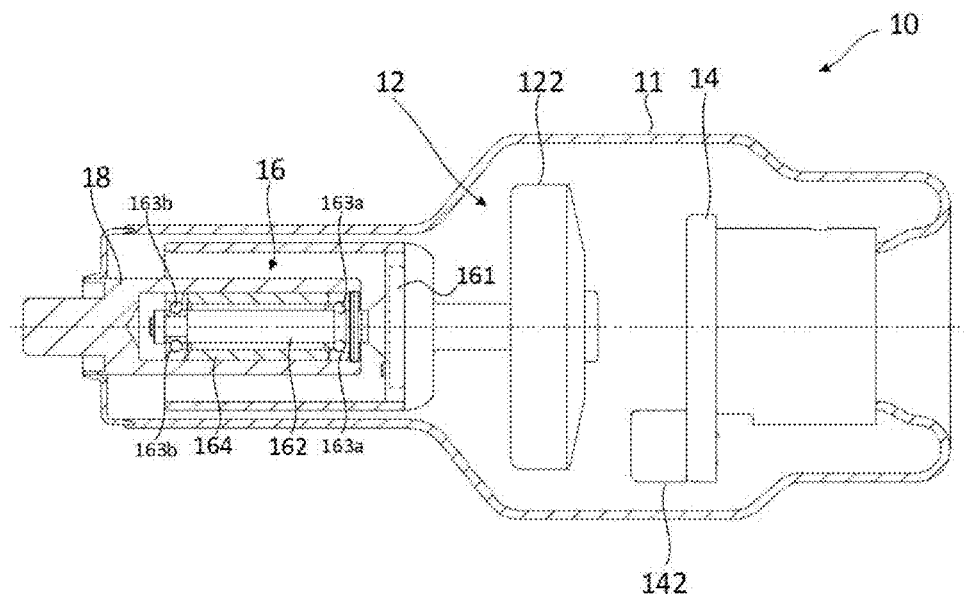
FIG. 1 is a structural schematic drawing showing an X-ray tube according to an exemplary embodiment.

10 X-ray tube
11 housing
12 anode
122 anode target disk
14 cathode
142 cathode filament
16 bearing assembly
161 flange
162 rotation shaft
163a first rolling body 163b second rolling body
164 separating sleeve
165 outer ring support
167 inner ring support
168 fixing ring
169 dust cap
18 bearing housing

DETAILED DESCRIPTION

To enable a clearer understanding of the technical features, objectives, and effects of the disclosure, particular embodiments of the present disclosure are now explained with reference to the accompanying drawings, in which identical labels indicate identical parts.

The noise of an X-ray tube during operation is an important index for judging the quality thereof. Whether this index is good or bad depends on the performance of a bearing unit of the X-ray tube. Except for some CT ball tubes in which liquid metal bearings are used, bearing units with solid lubrication are still used in most X-ray tubes with rotating anodes. Solid lubricant can ensure stable rotational performance of the bearing as well as good noise performance, etc.

The surfaces of steel balls in the bearings of existing X-ray tubes are generally plated with silver or lead to achieve lubrication. However, although silver-plated bearings can withstand temperatures of about 500° C., silver-plated bearings have high noise levels during operation. Lead-plated bearings have lower noise levels, but due to the lower melting point of lead, the film of lead plating on the surfaces of the bearing steel balls will evaporate away to other peripheral components when the ordinary operating temperature of the bearing reaches 400° C., and the lubrication lifespan will be sharply reduced. The result is hard contact between metals, specifically between the steel balls and the races in the bearing. Friction increases sharply, causing a rapid increase in bearing temperature. Consequently, the bearing components experience serious wear, noise increases, and eventually, the bearing locks up.

The X-ray tube provided in the present disclosure is explained in detail below with reference to the drawings and particular embodiments. Based on the relative positions of bearing steel balls and a flange configured to carry (e.g. be coupled to) an anode target disk, the application of different lubricating material layers to the surfaces of the steel balls is considered, in order to meet the requirements of suitability for a high-temperature environment and low-noise characteristics.

Figure 2:
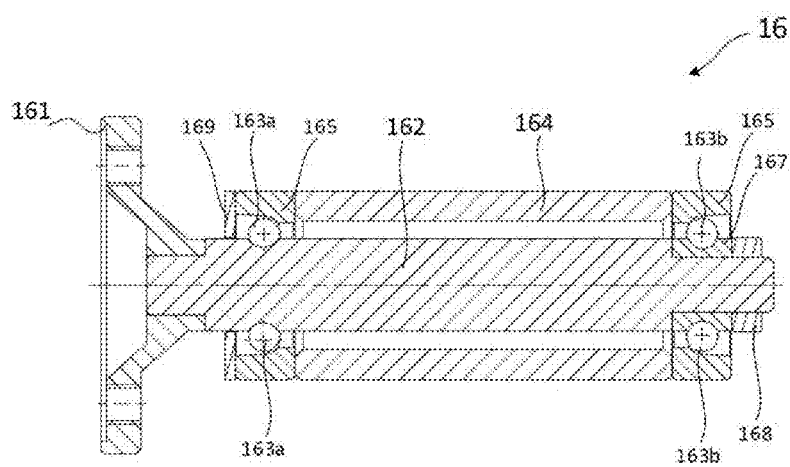
FIG. 2 is a structural schematic drawing showing a bearing assembly of an X-ray tube according to another exemplary embodiment.

FIG. 1 is a structural schematic drawing showing an X-ray tube according to an exemplary embodiment; FIG. 2 is a structural schematic drawing showing a bearing assembly of an X-ray tube according to another exemplary embodiment.

As shown in FIG. 1, the X-ray tube 10 comprises: a cathode 14 configured to produce electrons emitted toward a vacuum when energized, e.g. to emit the electrons produced toward a vacuum region by means of a cathode filament 142; and an anode 12 configured to comprise a rotatable anode target disk 122 to emit X-rays after sustaining electron bombardment. Moreover, the cathode 14 and the anode 12 are accommodated in a housing 11, which provides a vacuum environment.

As shown in FIG. 2, in some embodiments the X-ray tube 10 further comprises: a bearing assembly 16 configured to carry (e.g. be coupled to) the anode target disk 122. The bearing assembly 16 comprises a rotation shaft 162 configured to rotate with the anode target disk 122, and a bearing part comprising multiple bearing bodies which are constructed at an outer side of the rotation shaft 162 and are in contact therewith and in a rolling fit therewith. Furthermore, the bearing bodies comprise at least one first rolling body 163a configured to be located at a near-end position with respect to where the anode target disk 122 is carried (e.g. coupled), and at least one second rolling body 163b configured to be located at a far-end position with respect to where the anode target disk 122 is carried (e.g. coupled to the flange 161). The first rolling body 163a and the second rolling body 163b enable rolling friction to arise between the rotation shaft 162 and the bearing bodies as the anode target disk 122 rotates at high speed. A surface of the first rolling body 163a is at least coated with a first lubrication layer, and a surface of the second rolling body 163b is at least coated with a second lubrication layer. A temperature at which the first lubrication layer remains in a solid state is greater than a temperature at which the second lubrication layer remains in a solid state. Here, because the first rolling body 163a is closer to the position with respect to where the anode target disk 122 is carried (e.g. coupled to the flange 161), the operating temperature at this position, i.e. the temperature generated due to greater rolling friction between the first rolling body 163a and the rotation shaft 162, will be higher and easily conducted. The first lubrication layer is a silver plating layer; the surface of the first rolling body 163a is plated with the silver plating layer and able to withstand temperatures higher than 500° C., thus having better thermal stability or temperature resistance characteristics. Furthermore, the first rolling body 163a and the second rolling body 163b may be constructed in the form of balls or steel balls. Furthermore, the bearing assembly 16 may be mounted in a bearing housing 18 to be fitted to the X-ray tube 10. The bearing housing 18 may be fixed to the housing 11 by brazing with Kovar alloy. In addition, the anode target disk 122 can rotate under the driving action of an electric motor having a rotor and a stator.

In some embodiments, the bearing part further comprises multiple outer ring supports 165, the outer ring supports 165 being arranged to correspond to the first rolling body 163a and the second rolling body 163b, and the first rolling body 163a and second rolling body 163b being able to be in clearance contact with the outer ring supports 165 and the rotation shaft 162 or an inner ring support 167, respectively; and a separating sleeve 164 configured to be in fitted connection with the outer ring support 165 arranged to correspond to the first rolling body 163a and the outer ring support 165 arranged to correspond to the second rolling body 163b.

Furthermore, inner raceways may also be machined on the rotation shaft 162 to correspond to the positions of the first rolling body 163a and second rolling body 163b respectively, and a separate inner ring support 167 may also be included, fixed to the rotation shaft 162 by means of an interference fit and a fixing ring 168 mountable to a bottom end of the rotation shaft 162.

In some embodiments, to enable the X-ray tube 10 to take noise characteristics into account as well, the second rolling body 163b is located at a far-end position with respect to where the anode target disk 122 is carried (e.g. coupled to the flange 161), and the hardness of the second lubrication layer is chosen to be less than the hardness of the first lubrication layer. For example, the second lubrication layer plated on the second rolling body 163b may be a lead plating layer or a molybdenum disulfide layer. Taking a lead plating layer as an example, lead is softer and has a lower hardness than silver. The coefficient of friction of lead in a vacuum environment is 0.1-0.5, less than the coefficient of friction of silver in a vacuum (0.2-0.3). Moreover, in view of the fact that the second rolling body 163b is located further from the position with respect to where the anode target disk 122 is carried (e.g. coupled to the flange 161), it can dissipate heat more easily, and consequently the second lubrication layer coating the second rolling body 163b is not subject to high requirements in terms of resistance to high temperatures, so the noise characteristics thereof need to be taken into account. Thus, under equivalent conditions, a lead-plated bearing has a lower noise level and smaller frictional torque than a silver-plated bearing. Thus, the bearing assembly employing the concept of composite lubrication according to the relative positions with respect to where the anode target disk 122 is carried (e.g. coupled to the flange 161) can simultaneously have the advantages of resistance to high temperatures, low noise and low friction.

In some embodiments, as shown in FIG. 2, the X-ray tube 10 further comprises a flange 161 configured to be mounted and fixed to the anode target disk 122 and connected in a fixed manner to the rotation shaft 162, such that the first rolling body 163a is disposed at a near-end position of the flange 161 and the second rolling body 163b is disposed at a far-end position of the flange 161. For example, the flange 161 may be mounted and fixed to the anode target disk 122 by means of a bolt and a nut.

In some embodiments, the X-ray tube 10 further comprises a dust cap 169 configured to close a space formed between the outer ring support 165 and the rotation shaft 162.

Another aspect of the present disclosure provides an X-ray generating apparatus, comprising a power supply and the X-ray tube 10 as described above. The power supply can provide a tube voltage of 30-200 kV, and is configured to supply power to the X-ray tube 10. When the X-ray tube 10 is supplied with power, the cathode 14 can generate electrons and emit these electrons in the direction of the anode target disk 122. The electrons are transmitted through the vacuum environment and bombard the anode target disk 122, resulting in characteristic radiation to bremsstrahlung radiation ("braking" radiation) thereof, and thereby generating X-rays for scanning an imaging target.

Exemplary embodiments of the present disclosure are described above. It should be pointed out that those skilled in the art can make improvements and modifications without departing from the principle of the present disclosure and these improvements and modifications should also fall within the scope of protection of the present disclosure.

As used herein, "schematic" means "serving as an instance, example or illustration". No drawing or embodiment described herein as "schematic" should be interpreted as being a more preferred or more advantageous technical solution.

To make the drawings appear uncluttered, only those parts relevant to the present disclosure are shown schematically in the drawings; they do not represent the actual structure thereof as a product. Furthermore, to make the drawings appear uncluttered for ease of understanding, in the case of components having the same structure or function in certain drawings, only one of these is drawn schematically, or only one is marked.

In this text, "a" does not only mean "just this one"; it may also mean "more than one". As used herein, "first" and "second" etc. are merely used to differentiate between parts, not to indicate their order or degree of importance, or any precondition of mutual existence, etc.

What is claimed is:
1. An X-ray tube, comprising:
a cathode configured to produce electrons emitted towards a vacuum when energized;
an anode comprising a rotatable anode target disk configured to emit X-rays after sustaining bombardment by the electrons,
wherein the cathode and the anode are contained within a housing that provides a vacuum environment,
a bearing assembly coupled to the rotatable anode target disk, the bearing assembly comprising:
a rotatable shaft configured to rotate with the rotatable anode target disk; and
a bearing part comprising multiple bearing bodies that are (i) disposed at an outer side of the rotatable shaft, (ii) in contact with the rotatable shaft, and (iii) in a rolling fit with the rotatable shaft, the multiple bearing bodies comprising at least one first rolling body configured to be located at a near-end position of the bearing assembly with respect to a position of the rotatable anode target disk, and at least one second rolling body configured to be located at a far-end position of the bearing assembly with respect to the position of the rotatable anode target disk,
wherein a surface of the first rolling body is coated with a first lubrication layer,
wherein a surface of the second rolling body is coated with a second lubrication layer having a different composition than the first lubrication layer, and
wherein a temperature at which the first lubrication layer remains in a solid state is greater than a temperature at which the second lubrication layer remains in a solid state.

2. The X-ray tube as claimed in claim 1, wherein a hardness of the second lubrication layer is less than a hardness of the first lubrication layer.

3. The X-ray tube as claimed in claim 1, wherein the first lubrication layer comprises a silver plating layer.

4. The X-ray tube as claimed in claim 1, wherein the second lubrication layer comprises at least one of a lead plating layer or a molybdenum disulfide plating layer.

5. The X-ray tube as claimed in claim 1, wherein the multiple bearing bodies comprise multiple first rolling bodies including the at least one first rolling body, and multiple second rolling bodies including the at least one second rolling body, and further comprising:
a flange configured to be mounted and fixed to the rotatable anode target disk and connected in a fixed manner to the rotatable shaft,
wherein multiple ones of the first rolling bodies are disposed at the near-end position of the bearing assembly,
wherein multiple ones of the second rolling bodies are disposed at the far-end position of the bearing assembly, and
wherein the flange is positioned proximate to the near-end position of the bearing assembly.

6. The X-ray tube as claimed in claim 1, wherein the bearing part further comprises:
a first outer ring support arranged to correspond to the first rolling body;
a second outer ring support arranged to correspond to the second rolling body,
wherein the first rolling body is in clearance contact with the first outer ring support and with the rotatable shaft,
wherein the second rolling body is in clearance contact with an inner ring support; and a separating sleeve configured to be in a fitted connection with the first outer ring support and the second outer ring support.

7. The X-ray tube as claimed in claim 6, further comprising:
a dust cap configured to close a space formed between the first outer ring support and the rotatable.

8. The X-ray tube as claimed in claim 1, wherein the first rolling body is disposed within the X-ray tube at a first location that undergoes a higher operating temperature than that of a second location at which the second rolling body is disposed.

9. The X-ray tube as claimed in claim 1, wherein the second lubrication layer yields lower noise characteristics at the same temperature compared to the first lubrication layer.

10. The X-ray tube as claimed in claim 1, wherein the multiple bearing bodies comprise multiple first rolling bodies including the at least one first rolling body, and multiple second rolling bodies including the at least one second rolling body.

11. The X-ray tube as claimed in claim 10, wherein multiple ones of the first rolling bodies are disposed at the near-end position of the bearing assembly,
wherein multiple ones of the second rolling bodies are disposed at the far-end position of the bearing assembly.

12. The X-ray tube as claimed in claim 10, further comprising:
a flange configured to be mounted and fixed to the rotatable anode target disk and connected in a fixed manner to the rotatable shaft.

13. The X-ray tube as claimed in claim 12, wherein the flange is positioned proximate to the near-end position of the bearing assembly.

14. The X-ray tube as claimed in claim 1, wherein the bearing part further comprises:
a first outer ring support arranged to correspond to the first rolling body; and
a second outer ring support arranged to correspond to the second rolling body.

15. The X-ray tube as claimed in claim 14, further comprising:
a separating sleeve configured to be in a fitted connection with the first outer ring support and the second outer ring support.

16. The X-ray tube as claimed in claim 14, wherein the first rolling body is in clearance contact with the first outer ring support and with the rotatable shaft.

17. The X-ray tube as claimed in claim 1, wherein the second rolling body is in clearance contact with an inner ring support.

* * * * *